(12) United States Patent
Sosnowski

(10) Patent No.: US 6,895,798 B2
(45) Date of Patent: May 24, 2005

(54) METHOD OF CALIBRATING A SOLENOID OPERATED PRESSURE CONTROL VALVE AND METHOD OF CONTROLLING SAME

(75) Inventor: David R. Sosnowski, Lake Orion, MI (US)

(73) Assignee: Eaton Corporation, Cleveland, OH (US)

( * ) Notice: Subject to any disclaimer, the term of this patent is extended or adjusted under 35 U.S.C. 154(b) by 226 days.

(21) Appl. No.: 10/417,361

(22) Filed: Apr. 16, 2003

(65) Prior Publication Data
US 2004/0206155 A1 Oct. 21, 2004

(51) Int. Cl.[7] .............................................. G01L 27/00
(52) U.S. Cl. ......................................................... 73/1.57
(58) Field of Search ................................ 73/1.01, 1.72, 73/1.79, 1.68, 1.57; 192/3.58; 701/58, 68; 702/85, 98; 137/12

(56) References Cited

U.S. PATENT DOCUMENTS

| | | |
|---|---|---|
| 4,970,941 A | 11/1990 | Reinhardt .................... 91/433 |
| 5,109,692 A * | 5/1992 | Fitzgerald .................... 73/168 |
| 5,249,658 A * | 10/1993 | Goeckner et al. .......... 192/3.58 |
| 5,301,128 A | 4/1994 | Bybee .................... 364/551.01 |
| 5,600,237 A | 2/1997 | Nippert ................. 324/207.16 |

* cited by examiner

Primary Examiner—Robert Raevis
(74) Attorney, Agent, or Firm—Roger A. Johnston

(57) ABSTRACT

A method of calibrating a solenoid operated pressure control valve by sweeping the solenoid with increasing current from a minimum to a maximum and measuring and recording the signal pressure output and current at selected increments of current and storing the data pairs in a first table. The solenoid is similarly swept with decreasing current from the maximum to a minimum and the signal output pressure measured at selected increments of current and the data pairs stored in a second table. Upon installation of the valve in an hydraulic system to be controlled, the commanded signal pressure output $P_c$, if greater than the instantaneous signal pressure output $P_2$ is compared with the closest data pairs in the first table and, by interpolation, the required solenoid energization current $I_e$ determined. If the commanded signal pressure output $P_c$ is less than the instantaneous signal pressure $P_2$ is compared with the closest data pair in the second table and, by interpolation, the required solenoid energization current $I_e$ determined.

3 Claims, 3 Drawing Sheets

METHOD OF CALIBRATING A SOLENOID OPERATED PRESSURE CONTROL VALVE AND METHOD OF CONTROLLING SAME

BACKGROUND OF THE INVENTION

The present invention relates to the utilization of solenoid operated valves for pressure control in hydraulically operated systems where the solenoid is commanded by an electronic controller responsive to system operating parameter inputs. An example of such use of a solenoid operated pressure control valve is that employed for controlling the shifting or gear set changes in a motor vehicle automatic speed change transmission.

In such vehicle automatic speed change transmission applications, the solenoid operated pressure control valves are typically used to control the hydraulic fluid pressure supplied from a pump in the transmission to a hydraulic circuit connected to an actuator usually of the piston operated type for actuating a shifting clutch, typically a band clutch. Thus, a shifting pattern can be programmed into an electronic controller which is connected to energize a solenoid operated pressure control valve for actuating each of the shift band clutches in the transmission associated with the various gear sets. This arrangement has proven to be generally satisfactory; however, very precise control of the pressure to the clutch actuator is often required in order to effect smooth speed changes. This is particularly true where it is required to engage one band clutch for a non-driving gear set while the band clutch for a driving gear set is being disengaged. This requirement for precise pressure control to the band clutch actuators in an automatic transmission has further required precise control of the moving valve element in the solenoid operated valve in response to the energization current from the controller to the solenoid coil. Inasmuch as the shift control in the transmission is of the open loop type, the solenoid operated valve must be calibrated accurately and once calibrated is required to maintain the calibration throughout its service life. Furthermore, the effects of hysteresis in the solenoid valve occurring between increasing and decreasing current has proven to be troublesome and has resulted in prohibitive variation in the pressure output of the valve for the particular command signal or energization current.

Accordingly, it has been desired to find a way or means of improving the pressure output accuracy of a solenoid operated pressure control valve and to find a way of calibrating the valve in a manner which will assure accurate valve output in response to a command pressure energization current. It has further been desired to provide a way to improve the calibration and output of a solenoid operated pressure control valve in a manner which is easy to perform during valve manufacture and cost effective in high volume production such as for motor vehicle transmission applications.

BRIEF SUMMARY OF THE INVENTION

The present invention provides a method of calibrating a solenoid operated pressure control valve by energizing the valve with a sweep of increasing current and recording the valve output pressure at selected increments of current and recording the current and pressure readings as pairs of data and storing the data pairs in a table. The valve is also energized with a sweep of decreasing current and values of the measured output pressure are recorded at selected increments of current and the data recorded as pairs and stored in a second table. The values recorded and stored in the first and second table are then available for subsequent reference in operation of the valve in a system for which the valve is employed to provide a control output pressure.

Upon installation in an hydraulic system to be controlled, the command pressure signal from the controller employed for energizing the valve is compared with values stored in the table for increasing pressure and an interpolation is made for the command pressure signal between the nearest pair of data points in the table for computing the required energization current to provide the desired output pressure. Similarly, the command pressure is compared with the nearest data pair in the second table for interpolation to compute the required coil energization current upon decreasing current.

The present invention thus provides a technique for determining a required coil energization to achieve a desired output pressure from the valve based upon known performance of the valve in the increasing current mode and the decreasing current mode.

DETAILED DESCRIPTION OF THE INVENTION

Figure 1:
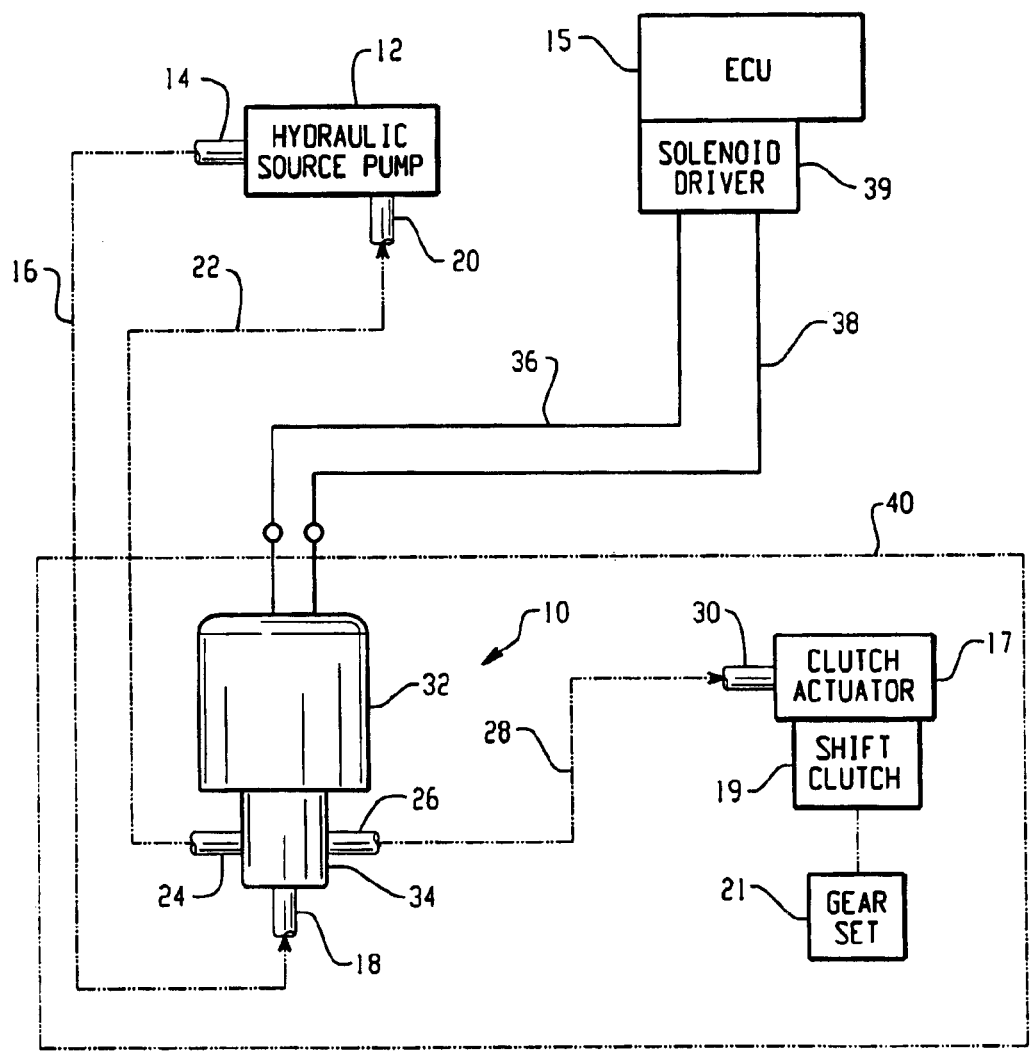
FIG. 1 is a schematic of the valve of the present invention as employed in a control system.

Referring to FIG. 1, the valve of the present invention indicated generally at 10 is illustrated as installed for use in a system for controlling the shifting of a motor vehicle automatic transmission. The system includes a hydraulic source pump 12, an electronic control unit (ECU) 14 and a clutch actuator 17 for actuating a shift clutch 18 for effecting engagement or disengagement of a gear set 20. Pump 12 provides hydraulic fluid under pressure at its outlet connected through conduit 16 to the high pressure inlet 18 of the valve 10. The pump receives fluid at its inlet 20 from conduit 22 which is connected to the exhaust or sump return outlet 24 of the valve 10. Valve 10 has a pressure control outlet 26 connected through conduit 28 to the pressure inlet port 30 of clutch actuator 17.

The valve 10 has a solenoid 32 which effects operation of a moveable valve member (not shown) within the valve body 34. Solenoid 32 is connected to a solenoid driver circuit 39 by electrical leads 36, 38. Solenoid driver 39 receives inputs from ECU 14. It will be understood that the arrangement of FIG. 1 is for a single motor vehicle automatic transmission shifting clutch actuator; and, as a subsystem 40 may be replicated for each shifting clutch to be engaged and disengaged within the transmission.

Figure 2:
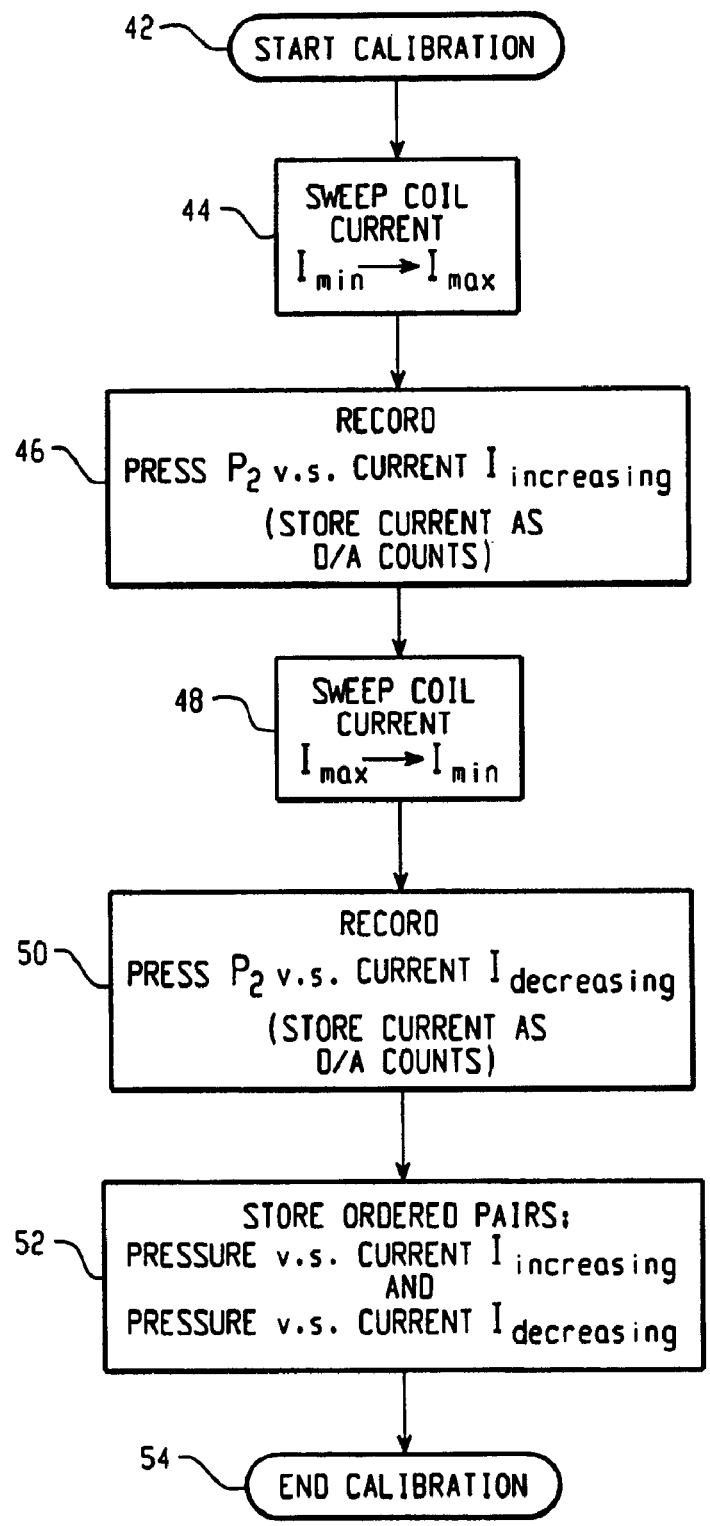
FIG. 2 is a block diagram of the program for calibration of the valve employed in the system of FIG. 1; and, FIG. 3 is a block diagram of the procedure for operating a valve as calibrated according to FIG. 2 in a control system.

Referring to FIG. 2, the calibration sequence is started at step 42 and the coil current is swept from a minimum $I_{min}$ to a maximum value $I_{max}$ at step 44. The procedure is continued at step 56 where values of the valve signal pressure output $P_2$ are recorded along with the value of the current in the coil $I_i$ at the time the pressure reading is also recorded; and, the data pairs are stored as a first table.

A procedure is continued at step 48 wherein the coil current is swept from the maximum $I_{max}$ to the minimum $I_{min}$. As the decreasing coil current is applied at step 48 the procedure then records the values of output pressure $P_2$ at various increments of the decreasing current $I_d$; and, the resulting data pairs are stored in a second table. Obviously, the table may be combined in a single electronic device.

The procedure then stores the data pairs $P_2$, $I_i$ and $P_2$, $I_d$ at step 52 and the calibration is ended at step 54. The calibration procedure of FIG. 2 thus produces the table of values of coil current versus pressure separately for increasing coil current and decreasing coil current.

Figure 3:
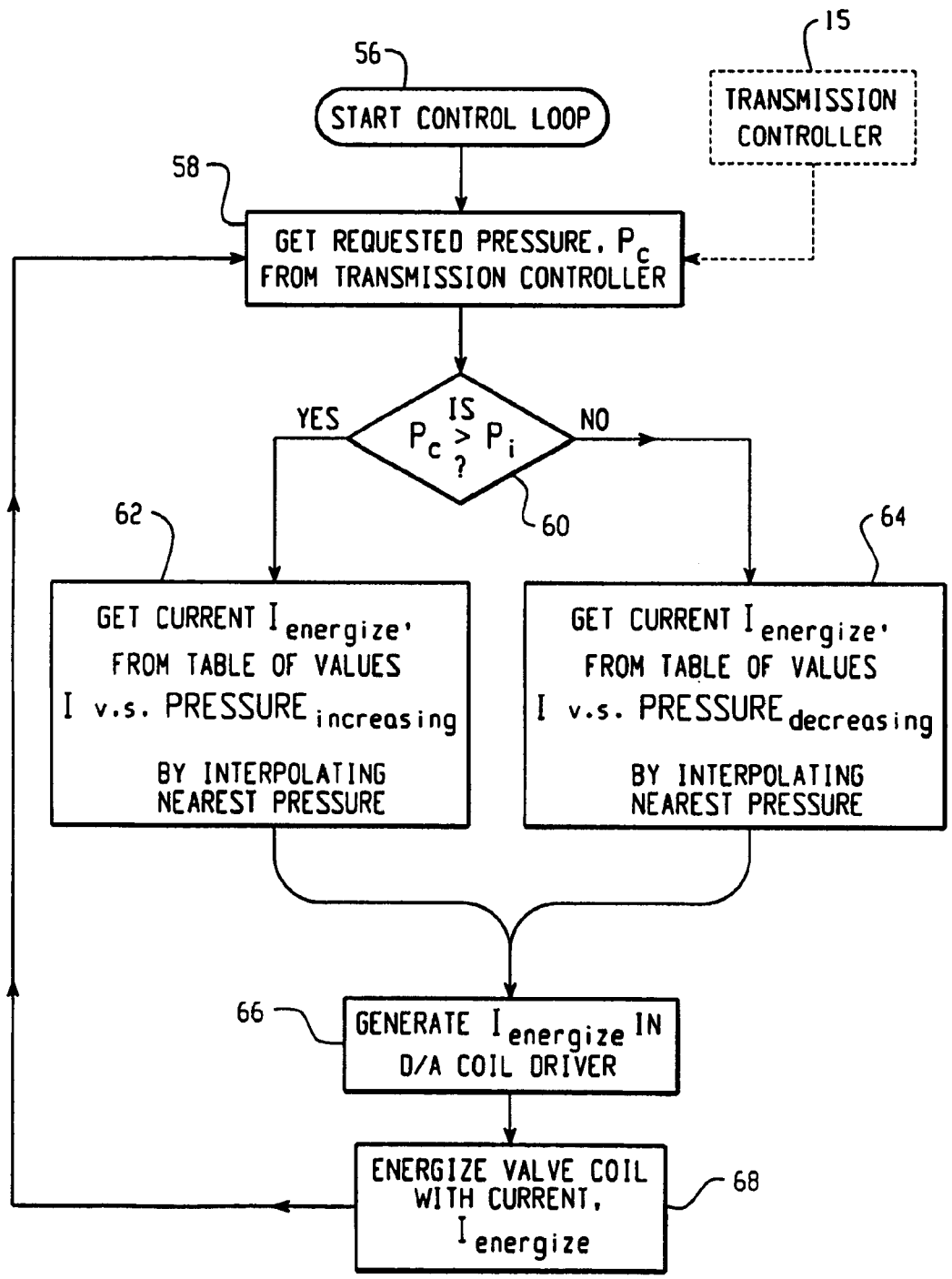

Referring to FIG. 3, the operation of the valve 10 in a system such as shown in FIG. 1 is set forth in flow diagram form. The operation is started at step 56 and proceeds to step 58 where the system receives a command pressure signal $P_c$ from the ECU 15 and proceeds to step 60 where a determination is made as to whether or not the pressure command signal $P_c$ is greater than the instantaneous value $P_i$ of the pressure control valve 10 of the present invention. If the determination at step 60 is affirmative, the operation of the system proceeds to step 62 where the coil energization current $I_e$ is obtained from the first table of data pairs of $P_2$ versus $I_i$ as described hereinabove with respect to FIG. 2 by interpolation with the closest data pair.

However, if the determination at step 60 is negative, the system proceeds to step 62 and interpolates the coil energization current $I_e$ from the nearest data pair in the second table for decreasing coil current $I_d$ as described hereinabove with respect to FIG. 2. It will be understood that the tables of data pairs for increasing and decreasing solenoid energization current may be programmed into the controller 15.

The system then proceeds to step 66 and generates the coil energization current $I_i$ in a coil driver and proceeds to step 68 to energize the solenoid 32 with the current $I_e$, as determined in either step 62 or 64 as the case may be. The system then returns to step 58.

The present invention thus provides a unique and novel technique for calibrating and storing data obtained by energizing a solenoid operated valve for both increasing and decreasing current as is encountered in operation for controlling the valve for increased control pressure output. The values of output control pressure and current measured for the corresponding pressure values are stored as data pairs in a table. The solenoid energization current for a desired signal pressure output by interpolation between the closest data pairs to the command pressure signal from the electronic controller.

Although the invention has hereinabove been described with respect to the illustrated embodiments, it will be understood that the invention is capable of modification and variation and is limited only by the following claims.

What is claimed is:

1. A method of controlling a solenoid operated pressure control valve for command by an electronic controller comprising:

(a) providing a first table of data pairs of solenoid current and valve output pressure for increasing solenoid current and a second table of data pairs of solenoid current and valve output pressure for decreasing solenoid current;

(b) providing a commanded pressure $P_C$ signal to the electronic controller and comparing the commanded pressure $P_c$ with the measured pressure $P_M$ at the valve outlet; and, if $P_C$ is greater than $P_M$, interpolating from the nearest value of pressure in the first table for the required solenoid energization current $I_E$ and interpolating in the second table if $P_C$ is less than $P_M$;

(c) generating $I_E$ and energizing said solenoid therewith; and, repeating step (b) with each change in $P_C$.

2. The method defined in claim 1, wherein said step of determining the solenoid current includes performing a binary search of said look-up tables and finding the nearest match.

3. A method of calibrating a solenoid operated pressure control valve for command by an electronic controller comprising:

(a) increasing the current to said solenoid from a minimum to a maximum;

(b) measuring the valve output pressure at selected values of the increasing current;

(c) recording the values of output pressure and the corresponding selected values of increasing current as data pairs;

(d) decreasing the current to said solenoid from a maximum to a minimum;

(e) measuring the valve output pressure at selected values of the current during said decreasing;

(f) recording the values of output pressure and the corresponding selected values of decreasing current as data pairs;

(g) storing the data pairs of (c) and (f).

* * * * *